United States Patent
Kwon et al.

(10) Patent No.: US 8,306,366 B2
(45) Date of Patent: Nov. 6, 2012

(54) METHOD AND APPARATUS FOR EXTRACTING FEATURE POINTS FROM DIGITAL IMAGE

(75) Inventors: Bom-jun Kwon, Seoul (KR); Tai-ho Choi, Suwon-si (KR); Hee-jin Chung, Seoul (KR); Geon-ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 12/196,720

(22) Filed: Aug. 22, 2008

(65) Prior Publication Data

US 2009/0052780 A1    Feb. 26, 2009

Related U.S. Application Data

(60) Provisional application No. 60/957,534, filed on Aug. 23, 2007.

(30) Foreign Application Priority Data

Oct. 30, 2007    (KR) .................... 10-2007-0109677

(51) Int. Cl.
*G06K 9/40*    (2006.01)
*G06K 9/46*    (2006.01)
*G06K 9/54*    (2006.01)
*G06K 9/60*    (2006.01)
*G06K 9/66*    (2006.01)

(52) U.S. Cl. ......... 382/304; 382/190; 382/260; 382/264
(58) Field of Classification Search .................. 382/190, 382/260, 264, 304; 700/2, 4
See application file for complete search history.

(56) References Cited

U.S. PATENT DOCUMENTS

| | | | | |
|---|---|---|---|---|
| 5,198,979 | A  * | 3/1993  | Moorhead et al. | 702/17 |
| 5,715,436 | A  * | 2/1998  | Kawai et al. | 345/505 |
| 5,822,467 | A  * | 10/1998 | Lopez et al. | 382/261 |
| 5,963,679 | A  * | 10/1999 | Setlak | 382/312 |
| 6,222,173 | B1 * | 4/2001  | Meeussen et al. | 250/208.1 |
| 6,549,646 | B1 * | 4/2003  | Yeh et al. | 382/132 |
| 6,711,293 | B1   | 3/2004  | Lowe | |
| 2001/0015821 | A1 * | 8/2001 | Namizuka et al. | 358/1.15 |
| 2002/0067432 | A1 * | 6/2002 | Kondo et al. | 348/576 |
| 2003/0165262 | A1 * | 9/2003 | Nishikawa et al. | 382/128 |
| 2005/0281334 | A1 * | 12/2005 | Walker et al. | 375/240.16 |

* cited by examiner

*Primary Examiner* — Yubin Hung
(74) *Attorney, Agent, or Firm* — NSIP Law

(57) ABSTRACT

An apparatus and method for extracting feature points from an image in a multiprocessor system having a plurality of processors, the method including: dividing an original image into a plurality of regions so as to be allocated to a plurality of processors of the multiprocessor system; performing, by the plurality of processors, blurring operations by levels; dividing the images blurred by levels into a plurality of regions to be allocated to the processors and calculating, by the plurality of processors, differences of Gaussian (DoGs); and generating feature point data according to the calculated DoGs. Because a plurality of processors performs the operations of the method, the total time to extract the feature points from the image is significantly reduced.

18 Claims, 11 Drawing Sheets

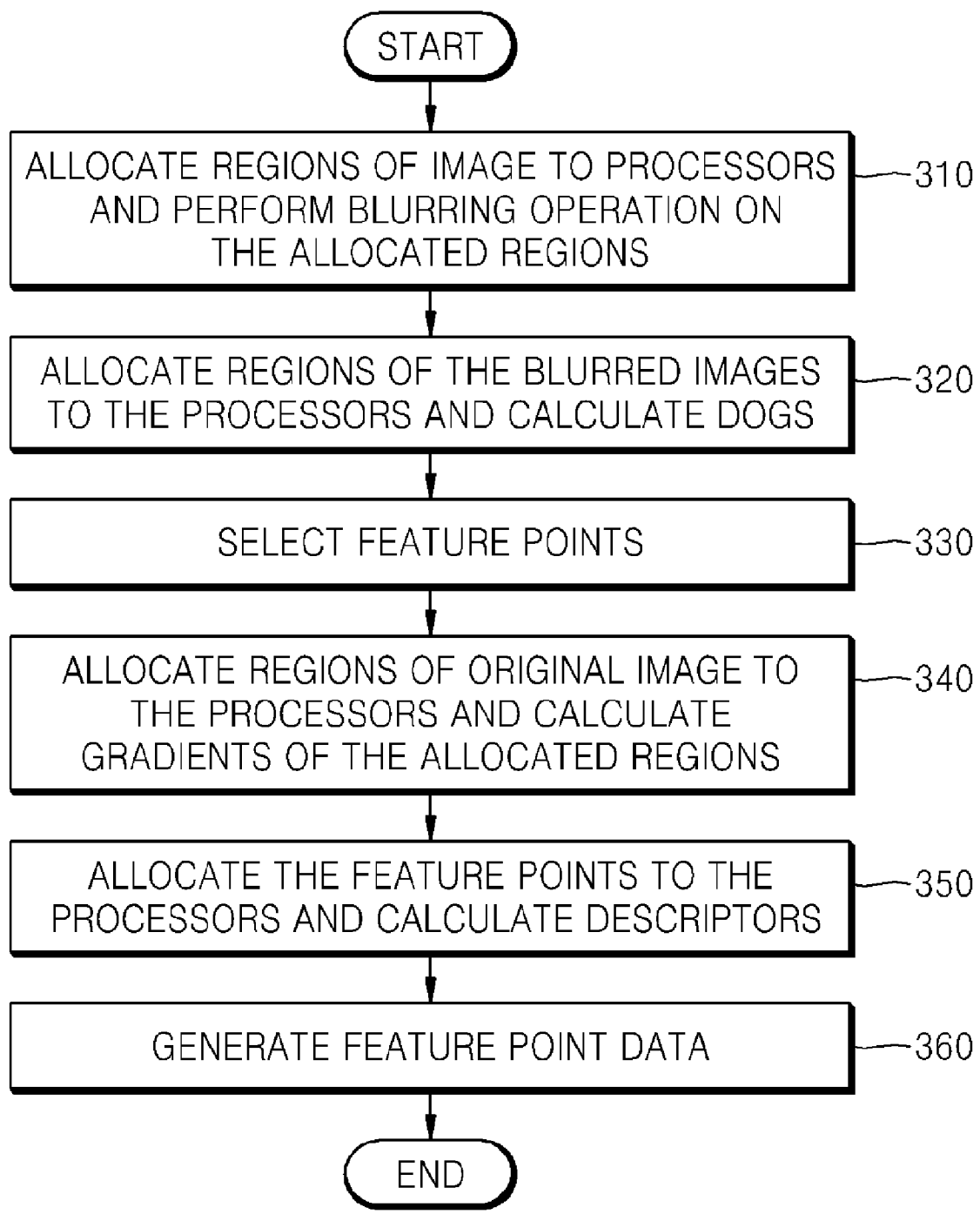

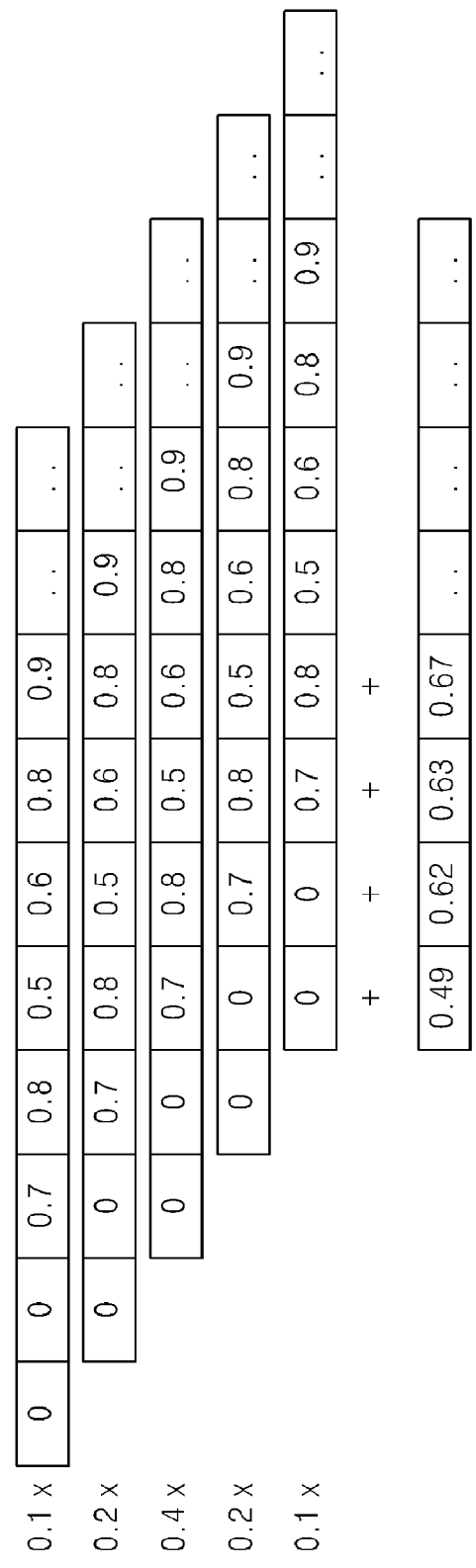

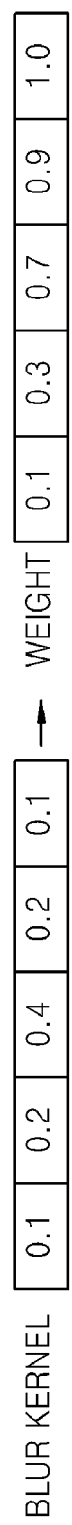
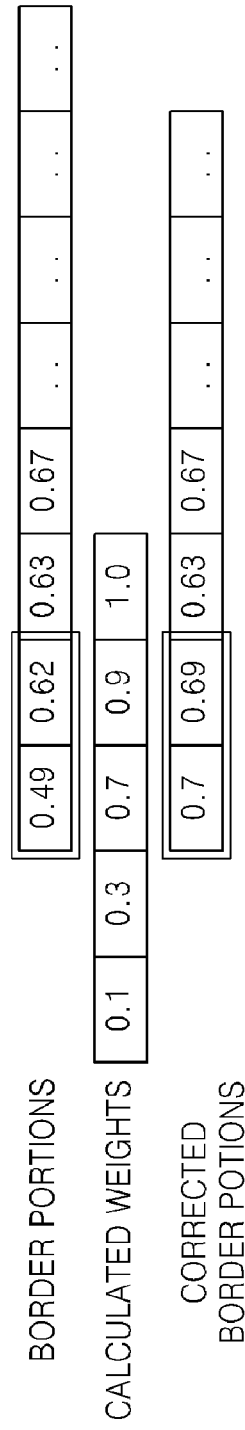
FIG. 7C
FIG. 7D

FIG. 9B

|  | PPE Only | PPE + 6 SPEs | Performance Gain |
|---|---|---|---|
| Image Blur | 1.44 sec | 0.35 sec | 406% |
| DoG | 0.06 sec | 0.01 sec | 446% |
| Gradient | 1.26 sec | 0.51 sec | 245% |
| Descriptor | 1.30 sec | 0.44 sec | 294% |

METHOD AND APPARATUS FOR EXTRACTING FEATURE POINTS FROM DIGITAL IMAGE

CROSS-REFERENCE TO RELATED APPLICATIONS

This application claims the benefit of U.S. Provisional Application No. 60/957,534, filed Aug. 23, 2007 in the U.S. Patent and Trademark Office, and Korean Patent Application No. 2007-109677, filed Oct. 30, 2007 in the Korean Intellectual Property Office, the disclosures of which are incorporated herein by reference.

BACKGROUND OF THE INVENTION

1. Field of the Invention

Aspects of the present invention relate to a method of extracting feature points from a digital image, and more particularly, to a method of effectively extracting feature points from a digital image in a multiprocessor system.

2. Description of the Related Art

Feature points of a digital image are points that represent a feature of the digital image distinguishable from other points. Generally, the feature points are disposed at a border or apex of an object. In addition, thousands of feature points may be extracted from the digital image, though the number of feature points can vary according to a size or content of the digital image.

Extracting feature points is an important operation in an image processing or computer vision method, as the feature points are used for image matching. The image matching is an operation of detecting corresponding portions from two images of the same object by using the feature points and may be applied in various methods (such as object/scene recognition, 3D structure calculation, stereo matching, motion tracking, panorama image generation, etc.).

FIG. 1 is a flowchart illustrating operations of generating a panorama image using feature points of images. Referring to FIG. 1, in operation 110, feature points are extracted from two or more images. Then, by comparing the feature points extracted from the images with each other, corresponding feature points are detected in operation 120. On the basis of the corresponding feature points, overlapping portions of the images are connected to each other in operation 130. A blending operation is performed on the connected portions of the images in operation 140. When images having different shades and exposures are connected (operation 130), a boundary between the overlapping images is clearly shown. Therefore, the blending operation (operation 140) is performed to enable the boundary of the connected portions to be natural.

As described above, since the feature points are disposed at the boundary, apices, etc., of objects in images, when scales or viewpoints of images are different, the feature points are easily changed even in images of the same object.

A scale invariant feature transform (SIFT) algorithm is conventionally used to extract feature points. Feature points extracted by the SIFT algorithm generally have good characteristics in that the feature points are constant to scales of images, rotations, deteriorations, 3D viewpoint changes, etc.

FIG. 2 is a flowchart illustrating a method of extracting feature points using the SIFT algorithm. Referring to FIG. 2, a blurring operation is performed on a digital image by levels using a Gaussian filter in operation 210. Here, when a scale of the image is changed, the blurring operation is repeated. In operation 220, a difference of Gaussian (DoG) between images blurred by levels at the same scale is calculated. In operation 230, feature points are selected according to a predetermined standard on the basis of the calculated DoG. In operation 240, gradients of all pixels in the original image are calculated to generate a gradient map. In operation 250, descriptors of the feature points selected in operation 230 are calculated by using the gradient map. In operation 260, final feature point data is generated. The feature point data includes coordinates of the feature point and a descriptor of a corresponding feature point. A detailed description of the SIFT algorithm is disclosed in a published document such as U.S. Pat. No. 6,711,293, so that a detailed description thereof is omitted.

As described above, though the SIFT algorithm has excellent characteristics, there is a problem in that the SIFT algorithm cannot easily be applied in a real-time application. This is because an operation of generating the feature point data of a single image takes several to tens of seconds according to a size or content of the image.

SUMMARY OF THE INVENTION

Aspects of the present invention provide a method of reducing a time to extract feature points from a digital image by using a scale invariant feature transform (SIFT) based feature point extraction algorithm in a multiprocessor system having a plurality of processors in parallel.

According to an aspect of the present invention, there is provided a method of extracting feature points from a digital image in a multiprocessor system using a scale invariant feature transform (SIFT) technique, the method including: dividing an original image into a plurality of regions so as to be allocated to a plurality of processors of the multiprocessor system; performing, by the plurality of processors, blurring operations by levels; dividing the images blurred by levels into a plurality of regions to be allocated to the processors and calculating, by the plurality of processors, differences of Gaussian (DoGs); and generating feature point data according to the calculated DoGs.

The generating of the feature point data may include: selecting feature points according to the DoGs; dividing the original image into a plurality of regions to be allocated to the processors to calculate gradient values for pixels of allocated regions; allocating the selected feature points to the processors to calculate descriptors for the allocated feature points according to the gradient values; and generating the feature point data according to coordinates of the selected feature points and the calculated descriptors.

The performing of the blurring operations may include: allocating lines of the original image to the plurality of processors to perform first convolution operations on the lines in a transverse direction; collating results of the first convolution operations into a collated image and rotating the collated image by 90°; allocating lines of the collated image to the plurality of processors; and performing second convolution operations on the lines in the transverse direction.

The performing of the blurring operations may include: adding a predetermined number of virtual pixels to both borders of an original line on which the blurring operation is to be performed; performing convolution operations on all pixels of the original line by using lines that are shifted by an offset of a blur kernel after the line added with the virtual pixels is multiplied by the blur kernel and the line added with the virtual pixels; and correcting results of the convolution operations on pixels including one or more of the virtual pixels.

According to another aspect of the present invention, there is provided a computer-readable medium having embodied thereon a computer program for the method of extracting the feature points.

According to another aspect of the present invention, there is provided a multiprocessor apparatus to extract feature points from a digital image according to an SIFT technique, the apparatus including: a plurality of processors to perform blurring operations by levels on corresponding regions of the digital image and to calculate DoGs on corresponding regions of the images blurred by levels; and at least one processor to generate feature point data according to the calculated DoGs.

According to yet another aspect of the present invention, there is provided a method of extracting feature points from a digital image in a multiprocessor system using a scale invariant feature transform (SIFT) technique, the method including: dividing one or more image regions of the digital image blurred by levels into a plurality of regions to be allocated to a plurality of processors of the multiprocessor system; calculating, by the plurality of processors, differences of Gaussian (DoGs); and generating feature point data according to calculated DoGs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart illustrating a method of extracting feature points of an image in a multiprocessor system according to an embodiment of the present invention;

FIGS. 7A to 7D are views explaining a method of correcting errors of results of convolution operations according to an embodiment of the present invention;

FIGS. 9A to 9B are views illustrating results of a performance test of a multiprocessor system according to an embodiment of the present invention.

DETAILED DESCRIPTION OF THE EMBODIMENTS

Figure 1:
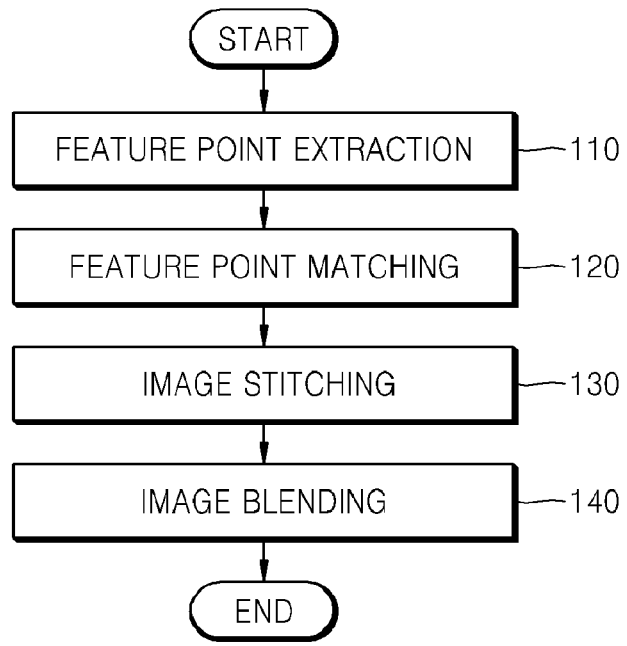
FIG. 1 is a flowchart illustrating a method of generating a panorama image using feature points of images.
Figure 2:
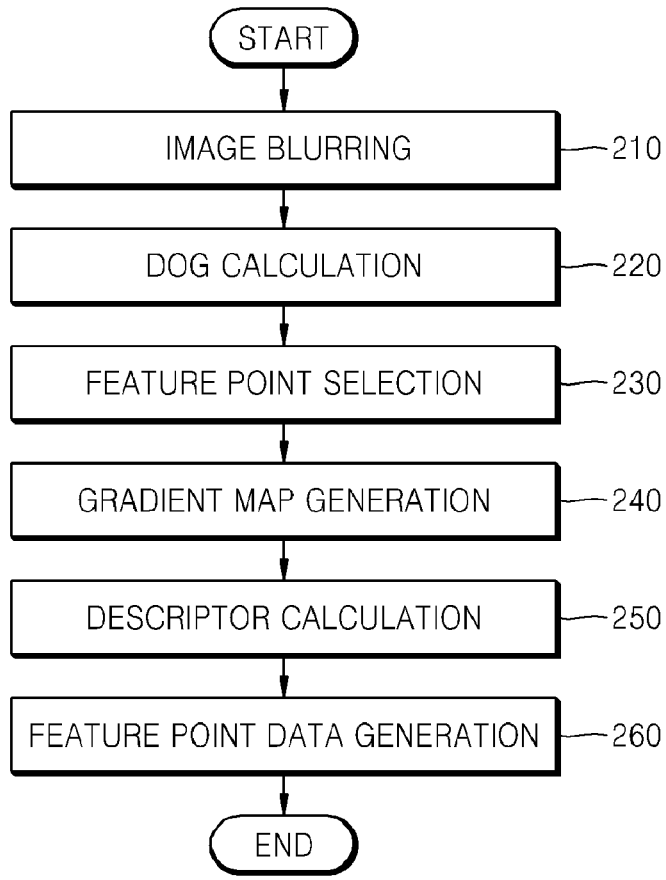
FIG. 2 is a flowchart illustrating a method of extracting feature points using a scale invariant feature transform (SIFT) algorithm.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 3 is a flowchart illustrating a method of extracting feature points of an image in a multiprocessor system according to an embodiment of the present invention. Referring to FIG. 3, an input image is divided into a plurality of regions so as to be allocated to a plurality of processors in operation 310. Furthermore, the plurality of processors, in parallel, performs blurring operations on the allocated regions. Results of the blurring operations, performed in parallel, are collated by at least one processor to generate a difference of Gaussian (DoG) image.

Figure 4A:
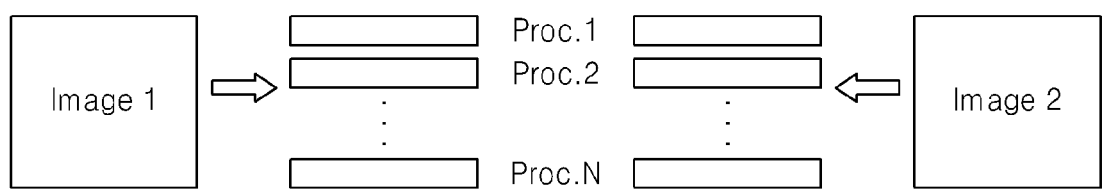
FIGS. 4A and 4B are views explaining a method of calculating a difference of Gaussian (DoG) of each region of an image performed by each processor of a multiprocessor system according to an embodiment of the present invention.
Figure 4B:
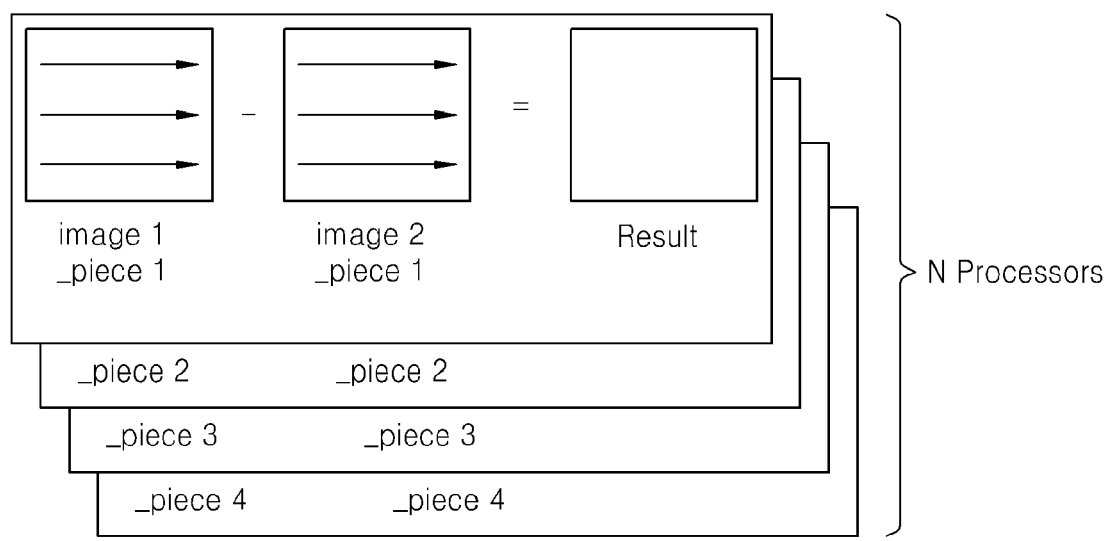

The blurred images (i.e., the DoG images) are divided into a plurality of regions so as to be allocated to the processors, and the processors, in parallel, calculate DoGs of the allocated regions in operation 320. FIGS. 4A and 4B are views explaining a method of calculating a DoG of each region of an image performed by each processor according to an embodiment of the present invention. Referring to FIG. 4A, as an example, two images (image 1 and image 2) are obtained by performing the blurring operation by levels at the same scale. Each of the image 1 and the image 2 is divided into a plurality of regions according to the number of the processors. As illustrated in FIG. 4B, the divided regions are allocated to the plurality of the processors, and the plurality of the processors calculate DoGs of the allocated regions.

Referring back to FIG. 3, by collating results of the DoG calculations, a feature point is selected according to a predetermined standard in operation 330. For example, when a DoG is larger than a predetermined threshold, the DoG is selected as the feature point. The threshold may vary according to different embodiments.

The input image (i.e., the original image) is divided into a plurality of regions so as to be allocated to the processors, and the processors, in parallel, calculate gradients of all pixels of the allocated regions in operation 340. The at least one processor collates the results calculated, in parallel, by the plurality of the processors to generate a gradient map.

The feature points selected in operation 330 are allocated to the processors, and the processors, in parallel, calculate descriptors for the allocated feature points by using the gradient map in operation 350. The feature points may be allocated to the processors in a round-robin scheme, though aspects of the present invention are not limited thereto.

Then, the at least one processor collates results of the calculating of the descriptors to generate feature point data in operation 360.

Figure 5A:
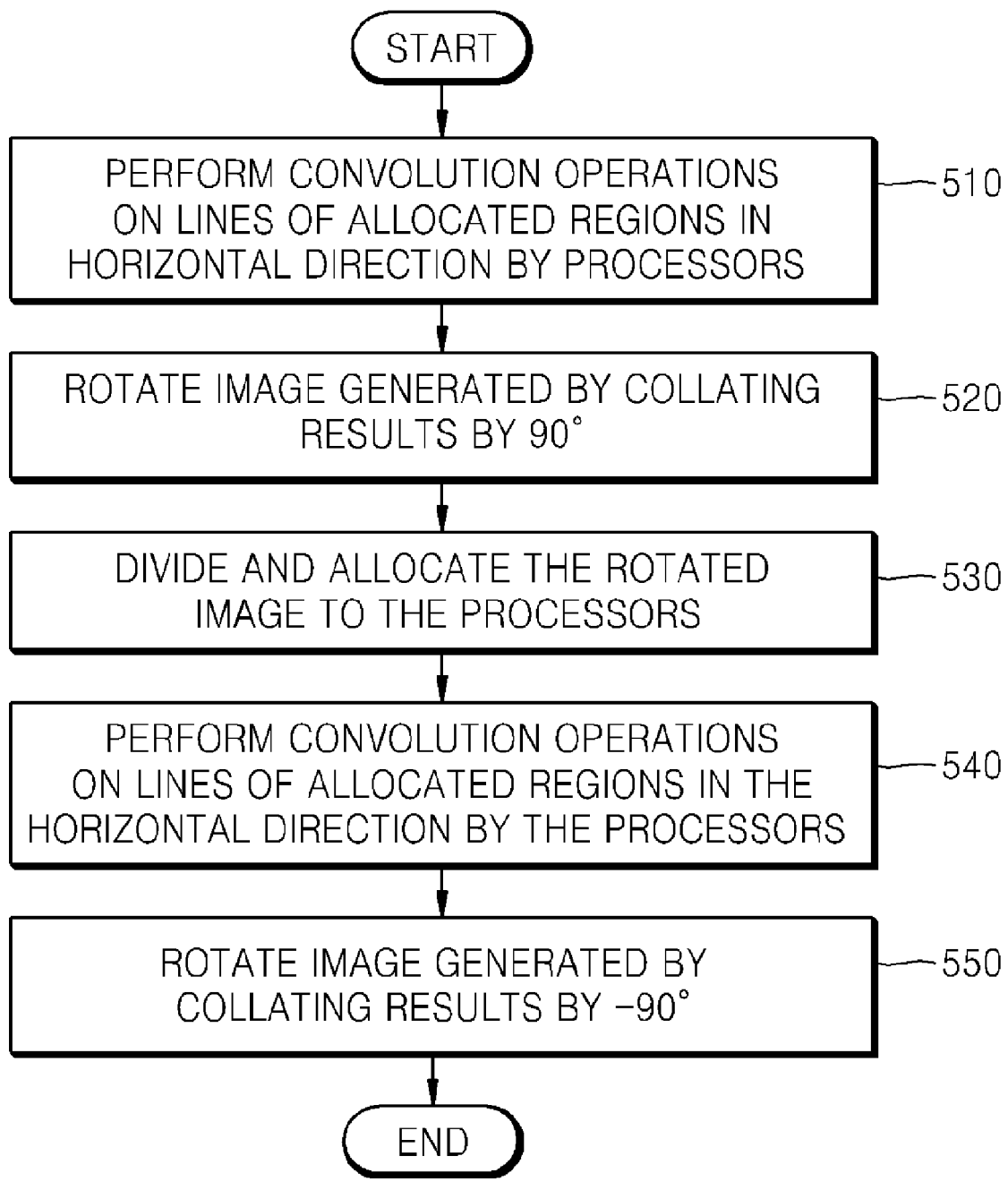
FIGS. 5A and 5B are views explaining a method of blurring an image according to an embodiment of the present invention.

FIG. 5A is a flowchart illustrating a method of blurring an image according to an embodiment of the present invention. Referring to FIG. 5, the processors perform convolution operations on lines of allocated regions in a transverse direction in operation 510. The at least one processor, described above with reference to operation 310 in FIG. 3, rotates an image generated by collating the results of the convolution operations by 90°. Then, the at least one processor divides the rotated image into a plurality of regions so as to be allocated to the processors in operation 530. The processors perform convolution operations on lines of the allocated regions in the transverse direction in operation 540. The at least one processor rotates an image generated by collating results of the convolution operations obtained in operation 540 by −90° in operation 550.

As described above, by rotating the image, lines in a longitudinal direction of the original image are disposed in continuous spaces of a memory. Therefore, a time for the processors to read pixel data on a line on which the convolution operation is to be performed can be reduced. This advantage can be increased in a case where the processors access a main memory only through a direct memory access (DMA) bus.

Figure 5B:
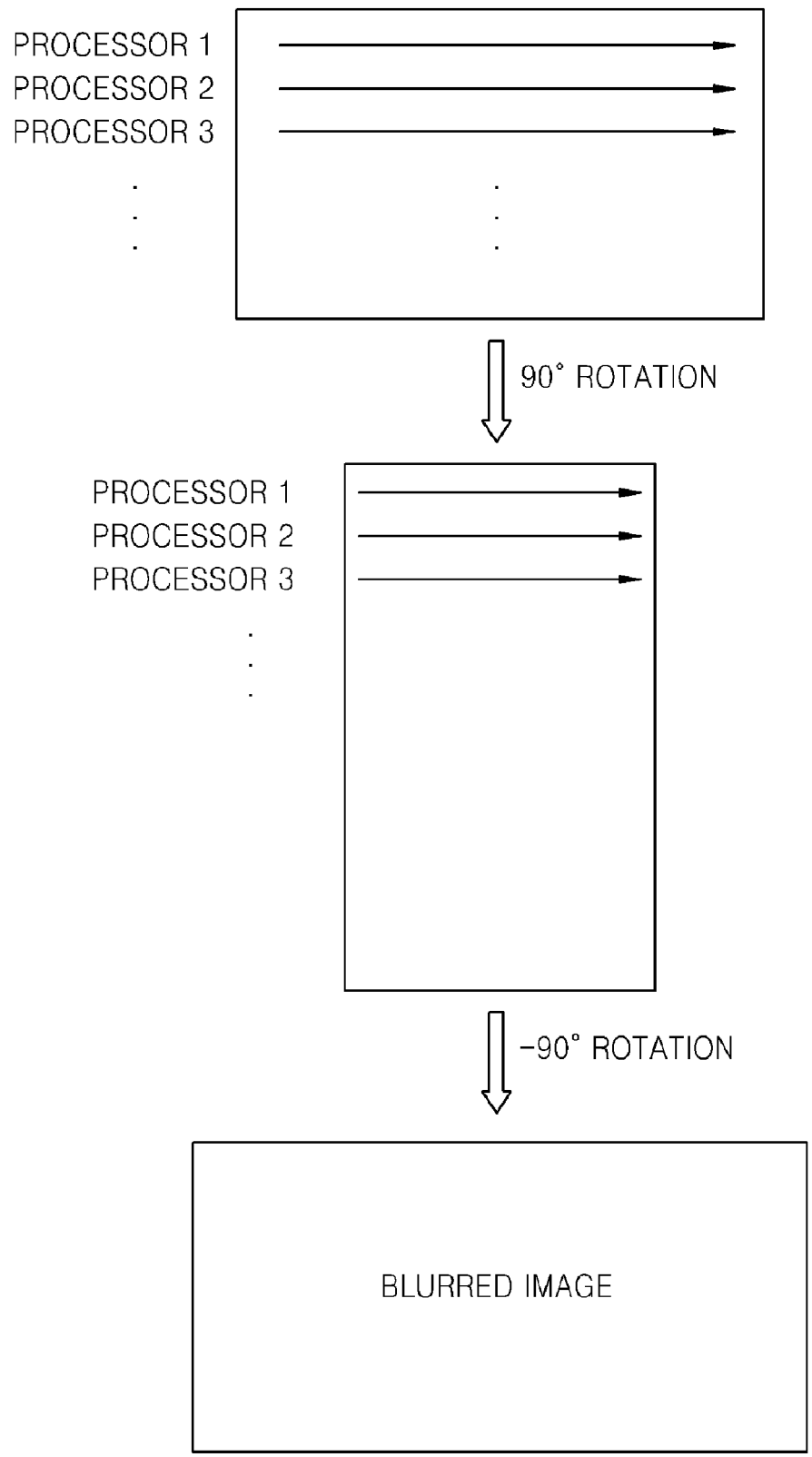

FIG. 5B is a view explaining the operations illustrated in FIG. 5A. Referring to FIG. 5B, the plurality of the processors, in parallel, perform the convolution operations in the transverse direction on the input image. After the convolution operations are performed on all lines, the plurality of the processors rotates the image and performs the convolution operations in the transverse direction again.

Figure 6A:
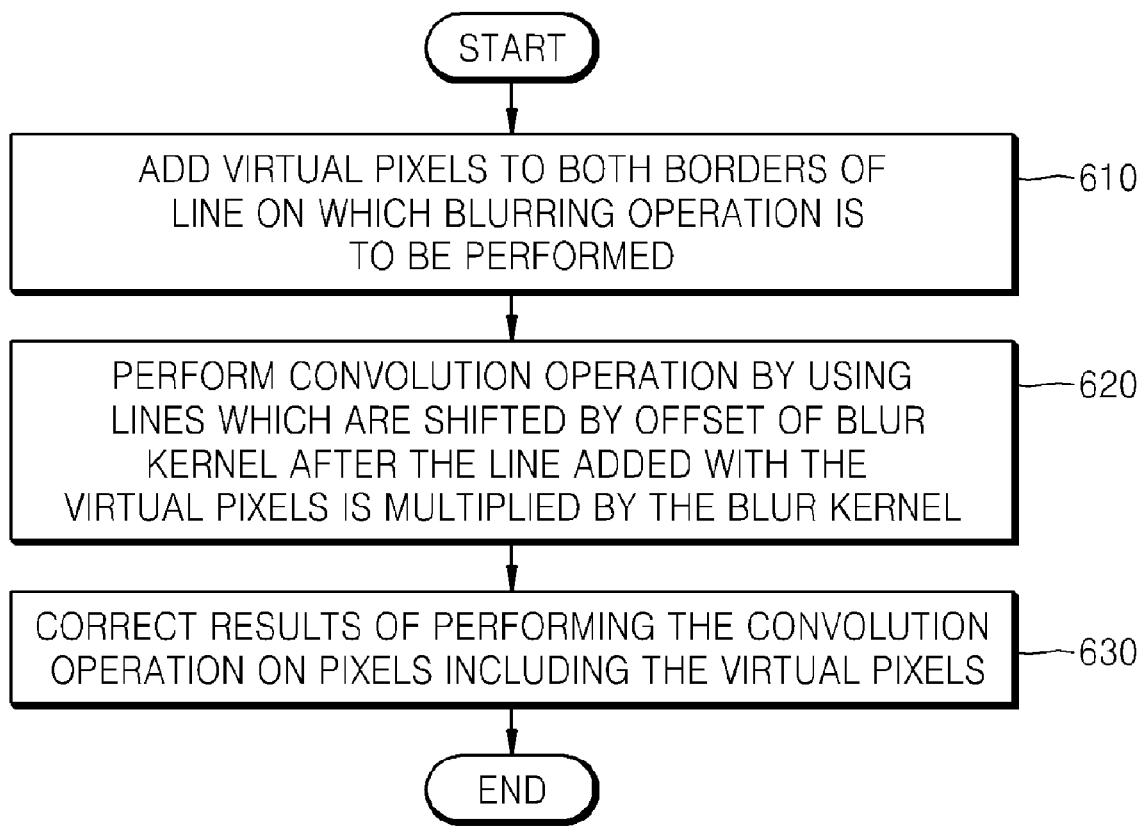
FIGS. 6A and 6B are views explaining a method of performing a convolution operation on a line performed by the processors according to an embodiment of the present invention.

FIG. 6A is a flowchart illustrating a method of performing convolution operations on a line by processors of a multiprocessor system according to an embodiment of the present invention. Referring to FIG. 6A, virtual pixels are added to both borders of a line on which the blurring operation is to be performed in operation 610. After multiplying the line to which the virtual pixels are added by a blur kernel, the convolution operation is performed on pixels of an original line by using lines shifted by an offset of the multiplied blur kernel in operation 620. Accordingly, the number of branches that may occur in an instruction pipeline can be reduced, and an efficiency can be increased. This will be described in detail with reference to FIG. 6B. Where a value of the virtual pixel is used in the convolution operation (operation 620), a resulting value is corrected in operation 630. That is, since the virtual pixel does not exist in the original image, errors that occur due to the virtual pixel are corrected. This will be described in detail with reference to FIGS. 7A to 7D.

Figure 6B:
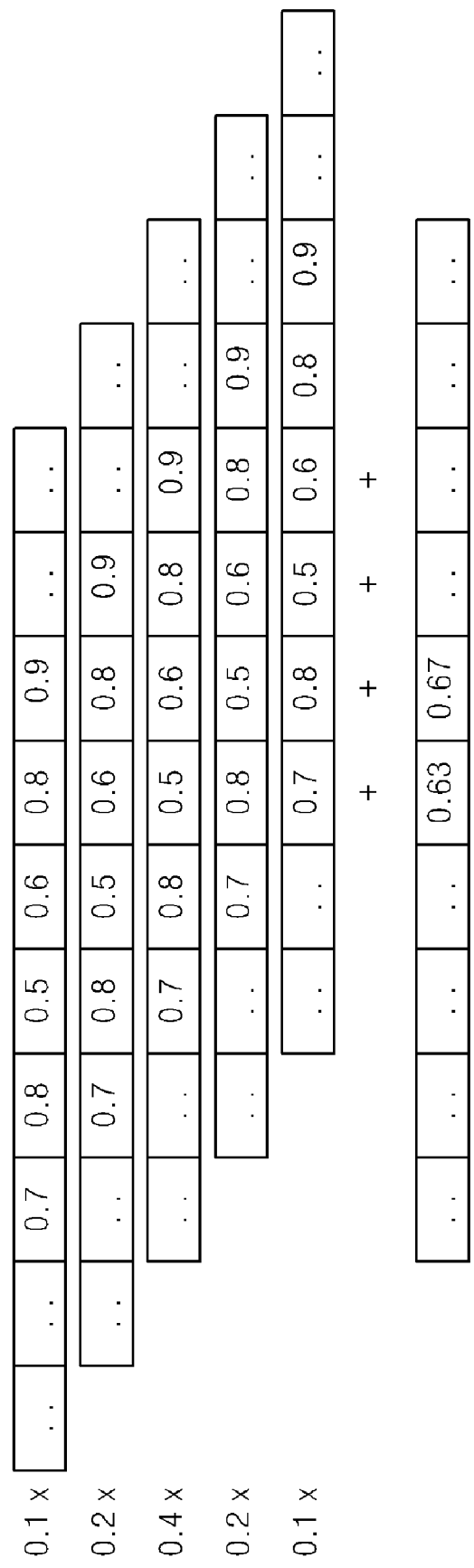

FIG. 6B is a view explaining a method of performing the convolution operation on a line performed by the processors according to an embodiment of the present invention. Referring to FIG. 6B, by way of example, a size of a blur mask is 5, a blur kernel is 0.1, 0.2, 0.4, 0.2, 0.1, and pixels of a line to which the blurring operation is performed are 0.7, 0.8, 0.5 . . . . According to a conventional method, when the convolution operation is to be performed on the pixel of 0.5, the convolution operation is performed by using five pixels including four adjacent pixels (i.e., pixels of 0.7, 0.8, 0.6, 0.8). Similarly, for the next pixel, five pixels are selected to perform the convolution operation. However, when the convolution operation is performed on all pixels of a single line according to the aforementioned method, a number of branches occur in an instruction pipe line system, so that the convolution operation is performed as illustrated in FIG. 6B.

First, virtual pixels are added to both borders of a line on which the blurring operation is to be performed (operation 610). According to the current embodiment, since the size of the blur mask is 5, two virtual pixels are added to each of the borders. Next, all of the pixels of the line are multiplied by the blur kernel (operation 620), and the line is shifted by an offset of the multiplied blur kernel. Since the size of the blur mask is 5, as illustrated in FIG. 6B, five lines are obtained. The convolution operation may be performed by using pixels in a same column of the lines. For example, a result of the convolution operation on the pixel having a pixel value of 0.5 is obtained as $(0.8\times0.1)+(0.6\times0.2)+(0.5\times0.4)+(0.8\times0.2)+(0.7\times0.1)=0.63$.

FIGS. 7A to 7D are views explaining a method of correcting errors of results of the convolution operations according to an embodiment of the present invention. In general, pixels at the both borders of a line on which the convolution operation is performed do not fit in a blur mask, so that the pixels are to be differently processed from pixels at the center portion of the line. Therefore, before the processor performs the convolution operation, the processor checks whether a pixel is at the border. This operation is implemented by a conditional statement, which causes the branches in the instruction pipe line. With reference to FIGS. 7A to 7D, operations for deleting the branches will now be explained.

FIGS. 7A to 7D illustrate substantially the same embodiment as illustrated in FIG. 6B, so that a detailed description is omitted. However, a pixel value of the virtual pixel is set to 0 in FIGS. 7A to 7D. Referring to FIG. 7B, a result of performing the convolution operation on the pixel of 0.7 in an original line is obtained as 0.49, and a result of performing the convolution operation on the pixel of 0.8 is obtained as 0.62. However, the results of performing the convolution operations on the border pixels are obtained by using the virtual pixels, such that the results may not be accurate. For example, the result of the performing the convolution operation on a second pixel from the left (i.e., the pixel of 0.8) is obtained as 0.62. In this case, one of five pixels used for the convolution operation is the virtual pixel. Accordingly, errors caused by the virtual pixel are to be corrected.

FIG. 7C illustrates a weight for correcting the errors. FIG. 7D is a view explaining a method of correcting the results of the convolution operations on pixels at the borders by using the weights. For example, in the convolution operation performed on the pixel of 0.7, two virtual pixels are used, and a blur kernel for the virtual pixels is 0.3(0.2+0.1). Therefore, by dividing the value 0.49 that is obtained by using the virtual pixels by 0.7(1−0.3), a value of 0.7 is obtained by correcting the errors caused by the virtual pixels.

Figure 8:
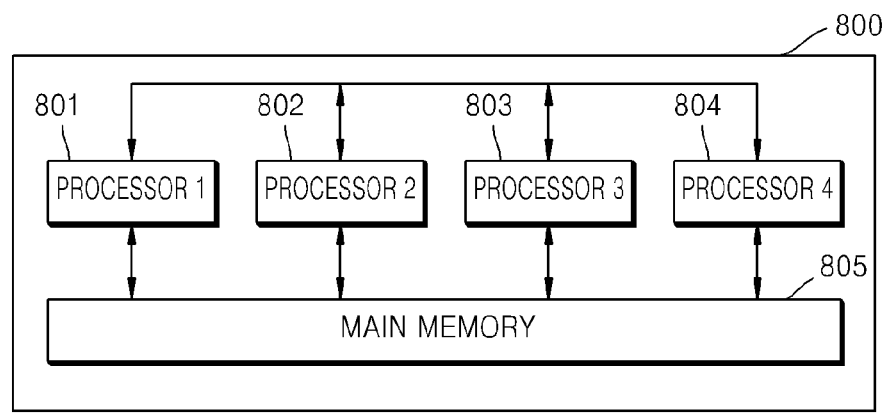
FIG. 8 is a view illustrating a configuration of a multiprocessor system according to an embodiment of the present invention.

FIG. 8 is a view illustrating a configuration of a multiprocessor system 800 according to an embodiment of the present invention. Referring to FIG. 8, the multiprocessor system 800 includes a plurality of processors 801, 802, 803, and 804 and a main memory 805. The multiprocessor system 800 may include various function blocks in addition to the blocks illustrated in FIG. 8. Although four processors are illustrated in FIG. 8, it is understood that any number of processors may be used according to aspects of the present invention.

As described above, the input image is stored in the main memory 805, and the plurality of processors 801, 802, 803, and 804, in parallel, extract feature points from the digital image according to the scale invariant feature transform (SIFT) technique. Specifically, the plurality of the processors 801, 802, 803, and 804 perform, in parallel, the blurring operation, the DoG calculation, the gradient calculation, and the descriptor calculation.

At least one processor 801, 802, 803, and/or 804 divides and allocates the image to other processors 801, 802, 803, and 804 so as to enable the processors 801, 802, 803, and 804 to perform the operations in parallel. The at least one processor 801, 802, 803, and/or 804 allocates addresses of divided regions of the image stored in the main memory 805 to the processors 801, 802, 803, and 804 to enable the processors 801, 802, 803, and 804 to perform the aforementioned operations. In addition, the at least one processor 801, 802, 803, and/or 804 collates results of the blurring operation, the DoG calculation, the gradient calculation, and the descriptor calculation and generates feature point data.

Figure 9A:
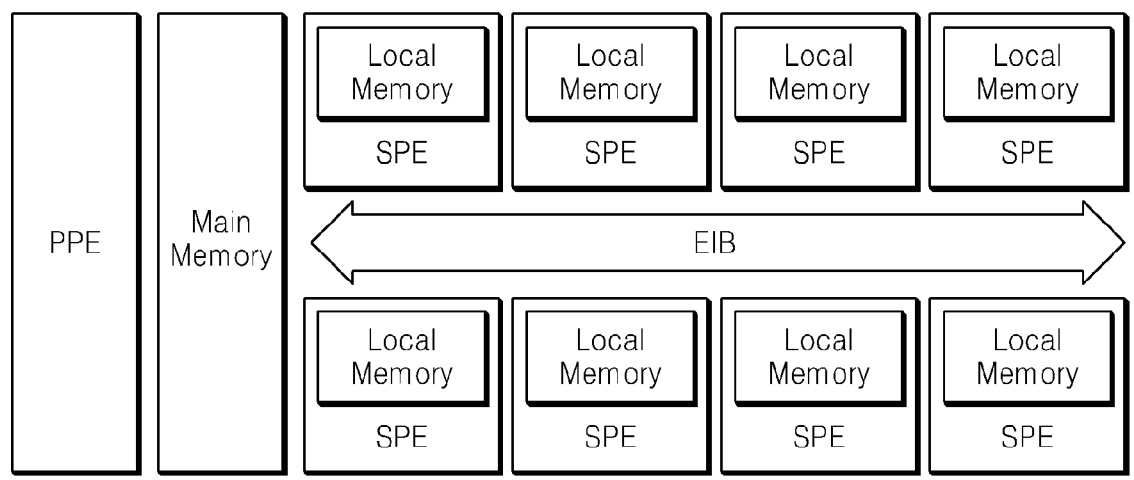

FIGS. 9A to 9B are views illustrating results of a performance test of a multiprocessor system according to an embodiment of the present invention. Specifically, FIG. 9A illustrates a configuration of a cell broadband engine (CBE), which is the multiprocessor system used in the performance test. The CBE is developed by the STI (Sony, Toshiba, IBM) consortium. Referring to FIG. 9A, the CBE includes nine processors that include a power processor element (PPE) and eight synergistic processing elements (SPEs). The PPE controls all of the operations and allocates data to the SPEs, and the SPEs perform allocated operations in parallel. Specifically, the PPE divides and allocates the image to the SPEs and receives and collates data on results of the blurring operation, the DoG calculation, etc. The SPE processes data by using a single instruction multiple data (SIMD) method. In addition, in order to reduce a data transmission time between the PPE and the SPEs, a double buffering technique may be used.

FIG. 9B illustrates the test results as a table. Referring to FIG. 9B, a time for the SPEs to perform allocated operations by levels is significantly shorter than a time for the PPE only to perform the operations by levels. Specifically, the performance of the CBE is improved by gains of 406%, 446%, 245%, and 294% for the image blurring operation, the DoG calculation, the gradient calculation, and the descriptor calculation, respectively, in terms of time.

As described above, according to aspects of the present invention, a time to extract feature points from an image can be reduced using a multiprocessor system, so that an efficiency of an image processing operation can be increased.

Aspects of the present invention can be written as computer programs and can be implemented in general-use digital computers that execute the programs using a computer-readable recording medium. Examples of the computer readable recording medium include magnetic storage media (e.g., ROM, floppy disks, hard disks, etc.), and optical recording media (e.g., CD-ROMs, or DVDs). Aspects of the present invention can also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of extracting feature points from a digital image in a multiprocessor system using a scale invariant feature transform (SIFT) technique, the method comprising:
dividing an original image into a plurality of regions so as to be allocated to a plurality of processors of the multiprocessor system;
performing, by the plurality of processors, blurring operations by levels;
dividing the images blurred by levels into a plurality of regions to be allocated to the processors and calculating, by the plurality of processors, differences of Gaussian (DoGs); and
generating feature point data according to the calculated DoGs, wherein:
the performing of the blurring operations comprises:
adding a predetermined number of virtual pixels to both borders of an original line to produce a revised line on which the blurring operation is to be performed;
performing convolution operations on all pixels of the revised line using a blur kernel; and
correcting a result value obtained from one of the convolution operations in which one or more of the virtual pixels is used for calculating the result value, and the correcting the result value comprises:
generating a correction weight which indicates a ratio of a sum of kernel values applied to pixels other than the virtual pixels in the one of the convolution operations to the sum of all kernel values; and
dividing the result value by the generated correction weight.

2. The method as claimed in claim 1, wherein the generating of the feature point data comprises:
selecting feature points according to the DoGs;
dividing the original image into a plurality of regions to be allocated to the plurality of processors to calculate gradient values for pixels of allocated regions;
allocating the selected feature points to the processors to calculate descriptors for the allocated feature points according to the gradient values; and
generating the feature point data according to coordinates of the selected feature points and the calculated descriptors.

3. The method as claimed in claim 2, wherein the allocating of the selected feature points comprises allocating the selected feature points to the processors according to a round-robin scheme.

4. The method as claimed in claim 2, wherein the selecting of the feature points comprises collating the calculated DoGs to select the feature points according to a predetermined standard.

5. The method as claimed in claim 4, wherein the selecting of the feature points further comprises selecting a DoG as a feature point if the DoG is larger than a predetermined threshold.

6. The method as claimed in claim 2, wherein the allocating of the selected feature points comprises:
collating the calculated gradient values to generate a gradient map; and
calculating the descriptors according to the gradient map.

7. The method as claimed in claim 1, wherein the performing of the blurring operations comprises:
allocating lines of the original image to the plurality of processors to perform first convolution operations on the lines in a transverse direction;
collating results of the first convolution operations into a collated image and rotating the collated image by 90';
allocating lines of the collated image to the plurality of processors; and
performing second convolution operations on the lines in the transverse direction.

8. The method as claimed in claim 1, wherein the performing of the blurring operations comprises performing, by the plurality of processors, the blurring operations in parallel.

9. The method as claimed in claim 1, wherein the dividing of the blurred images comprises calculating, by the plurality of processors, the DoGs in parallel.

10. The method as claimed in claim 1, wherein:
the dividing of the blurred images comprises dividing the blurred images into N number of regions; and
the multiprocessor system includes N number of processors.

11. A non-transitory computer-readable medium encoded with the method of claim 1 and implemented by a computer.

12. A multiprocessor apparatus to extract feature points from a digital image according to a scale invariant feature transform (SIFT) technique, the apparatus comprising:
a plurality of processors to perform blurring operations by levels on corresponding regions of the digital image and to calculate differences of Gaussian (DoGs) on corresponding regions of the images blurred by levels; and
at least one processor to generate feature point data according to the calculated DoGs wherein:
the plurality of processors add a predetermined number of virtual pixels to both borders of an original line to produce a revise line on which the blurring operation is to be performed and perform convolution operations on all pixels of the revised line using a blur kernel, and
at least one processor corrects a result value obtained from one of the convolution operations in which one or more of the virtual pixels is used for calculating the result value by generating a correction weight which indicates a ratio of a sum of kernel values applied to pixels other than the virtual pixels used in the one of the convolution operations to the sum of all kernel values and dividing the result value by the generated correction weight.

13. The apparatus as claimed in claim 12, wherein:
the plurality of processors calculate gradient values for pixels of corresponding regions of the digital image and are allocated with feature points selected by the at least one processor to calculate descriptors according to the calculated gradient values; and
the at least one processor selects the feature points according to the calculated DoGs and generates the feature point data by using coordinates of the selected feature points and the calculated descriptors.

14. The apparatus as claimed in claim 13, wherein the at least one processor allocates the selected feature points to the plurality of processors according to a round-robin scheme.

15. The apparatus as claimed in claim 13, wherein the plurality of processors perform first convolution operations on lines of the original image in a transverse direction and perform second convolution operations in the transverse direction on lines of an image that is generated by collating results of the first convolution operations into a collated image and rotating the collated image by 90°.

16. The apparatus as claimed in claim 13, wherein the at least one processor collates the DoGs and selects a DoG therefrom as a feature point if the DoG is larger than a predetermined threshold.

17. The apparatus as claimed in claim 12, wherein the plurality of processors perform the blurring operations in parallel.

18. The apparatus as claimed in claim 12, wherein the plurality of processors calculate the DoGs in parallel.

* * * * *